(No Model.)
W. JARRELL.
CHURN.
No. 334,229. Patented Jan. 12, 1886.
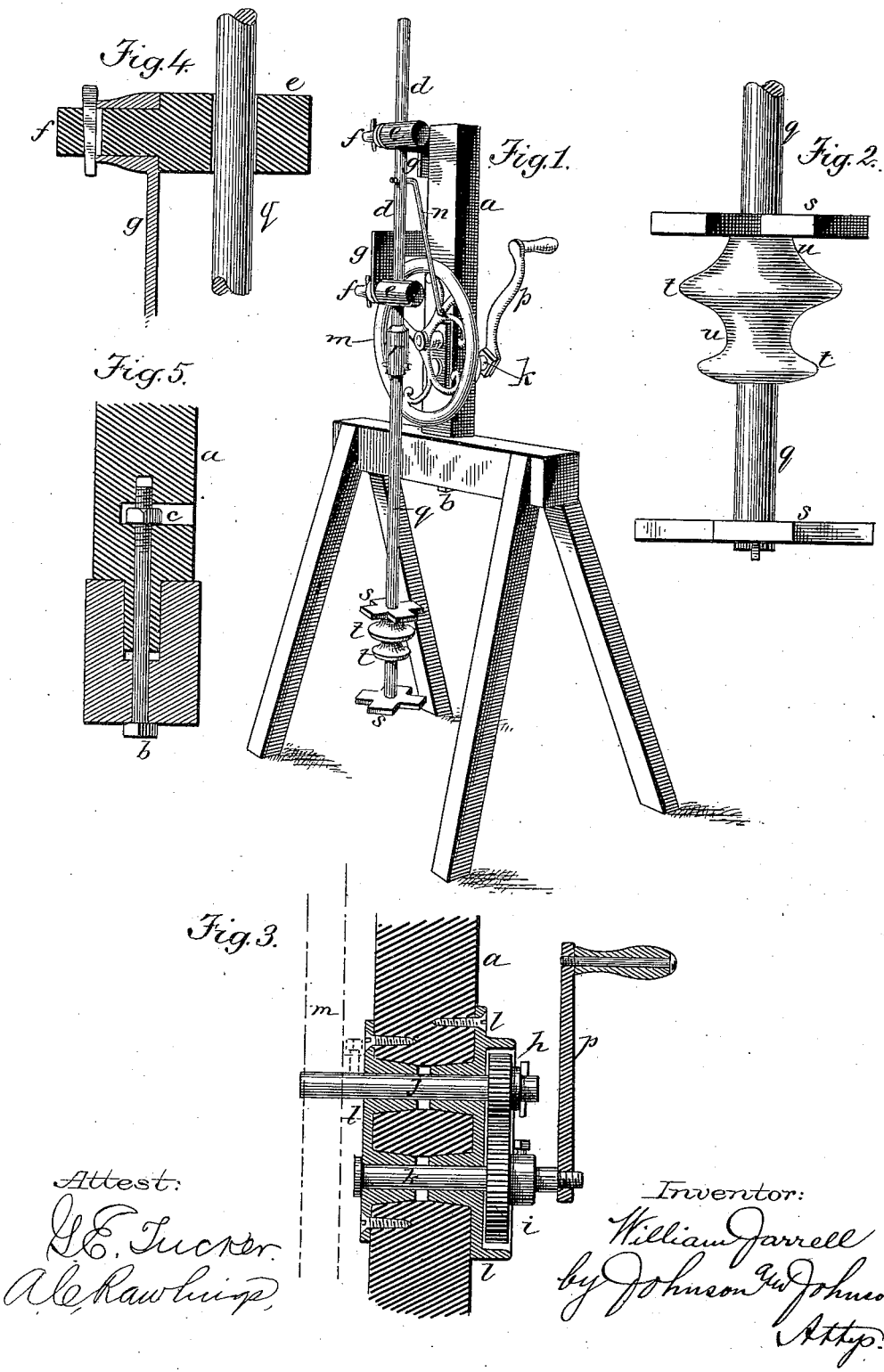
Attest:
G. E. Tucker
A. C. Rawlings
Inventor:
William Jarrell
by Johnson & Johnson
Atty.

UNITED STATES PATENT OFFICE.

WILLIAM JARRELL, OF HUMBOLDT, TENNESSEE, ASSIGNOR OF ONE-HALF TO WATKINS H. DODSON, OF SAME PLACE.

CHURN.

SPECIFICATION forming part of Letters Patent No. 334,229, dated January 12, 1886.

Application filed August 22, 1885. Serial No. 175,063. (No model.)

*To all whom it may concern:*

Be it known that I, WILLIAM JARRELL, a citizen of the United States, residing at Humboldt, in the county of Gibson and State of Tennessee, have invented new and useful Improvements in Churns, of which the following is a specification.

The object of my improvement is to produce a cheap and effective reciprocating churn structure in which the support for the dasher-operating parts consists of a carpenter's horse and a post secured to the top thereof, to which the operating-gear, the dasher-rod, and its guides are secured. The dasher-stem is removably socketed in the dasher-rod, and is formed of two crossed beater-arms and an intervening body of two knobs of unequal diameter, having a curved outline forming two necks adapted to produce effective agitation of the cream.

Referring to the accompanying drawings, Figure 1 represents the operating churn structure in perspective; Fig. 2, the dasher in elevation; Fig. 3, a vertical section of the post, showing the dash-operating gear; Fig. 4, a detail showing one of the dasher-rod guides; and Fig. 5 shows the manner of securing the post to the horse.

The frame is a carpenter's horse and a post, $a$, mortised into the top of the horse and firmly secured by a bolt, $b$, passing vertically into the post from the under side of the top bar of the horse into a nut, $c$, set in the post above the horse. The dasher operates vertically at the side of the horse, and its driving-rod $d$ is fitted in guide-blocks $e\ e$, pinned by shouldered stems $f$ into plate-brackets $g$, secured to the side of the post, so as to project therefrom over the top of the horse and support the guide-blocks in position at right angles to the bracket-plates and the dasher-rod vertically in front of the post.

The dasher-operating gear consists of two matching pinions, $h\ i$, fixed upon short shafts $j\ k$, fitted in plates $l$, having hub-bearings secured to the opposite sides of the post, as shown in Fig. 3. One of these gear-shafts, preferably the upper one, has the fly-wheel $m$ between the post and the dasher-rod, to which it is connected by a rod, $n$, so as to reciprocate the dasher-rod when the fly-wheel is driven by the crank $p$ at the back of the post. The dasher-stem $q$ is detachably socketed at $r$ into the lower end of the dasher-operating rod, as shown in Fig. 1, and the dasher is made of two beaters, $s\ s$, of crossed arms, and between these a curved body of two knobs, $t\ t$, of unequal diameter, forming a curved outline having a neck, $u$, between the knobs and at their junction with the top crossed beater. This construction is found to produce butter in a very short time, and to produce the full yield of the cream, the double knobs serving, with the beaters, to give thorough agitation to the cream.

Any suitable closed tub may be used with the dasher, and can be removed with it from the operating structure. The horse is about twenty-five inches high, and its top post is about twenty-one inches high, and the throw of the churn-dash is from six to ten inches, with a very rapid movement, the cranked-shaft pinion being about twice the size of the fly-wheel pinion. The hubbed bearing-plates for the gear-shafts give solid bearings in a post, which is about two inches and a half thick and about five inches wide, so that with a horse of strong timber the operating structure forms a cheap firm frame for the operating parts.

Referring to the shouldered keyed guide-blocks $e\ e$, they can be easily set upon their shouldered stems to give a free movement to the rod, and they can be changed one for the other and reversed, if necessary, to give a smooth movement. The hubs of the shaft-containing plates meet in the post and form a solid housing for the short shafts, and greatly increase the durability of the structure.

A churn-dash has been made with beaters having flat surfaces arranged in star form, and also with bulbous forms of beaters; but these separate agitators are not as effective as when combined in the way described.

I am also aware that a churn-operating structure having the dasher-rod and its operating parts consisting of two pinions, a wheel, and a pitman connecting the latter with dasher-rod mounted upon a single upright supported on a base is old, and my claim is therefore limited to the particular construction of the churn-operating structure as a unitary structure, and to the combinations of devices by which the churn is rendered durable and effective.

I claim—

1. The structure consisting of a horse having the tenoned post secured to the horse-bar by the bolt *b* and nut *c*, the socketed bearing-brackets *g g*, attached to the post, having shouldered keyed guide-blocks *e e*, and the plates *l l*, having bearing-hubs meeting in said post, in combination with the dash-rod working through the said blocks, the pitman, and the operating-gearing, as shown and described.

2. The structure herein described, consisting of the horse, the post *a*, the brackets *g g*, attached to the post, and the shouldered bearing-blocks *e e*, mounted in said brackets, in combination with the hubbed bearing-plates *l l*, the dasher-rod having the curved knobs *t u* and cross-arms *s s*, the balance-wheel, and the connecting-rod *n*, as shown and described.

In testimony whereof I have hereunto set my hand in the presence of two subscribing witnesses.

WILLIAM JARRELL.

Witnesses:
A. E. H. JOHNSON,
J. W. HAMILTON JOHNSON.